Nov. 14, 1939.　　　J. J. DILKS, JR　　　2,179,617
PHOTOGRAPHIC REPRODUCTION APPARATUS
Original Filed June 19, 1935　　9 Sheets-Sheet 1
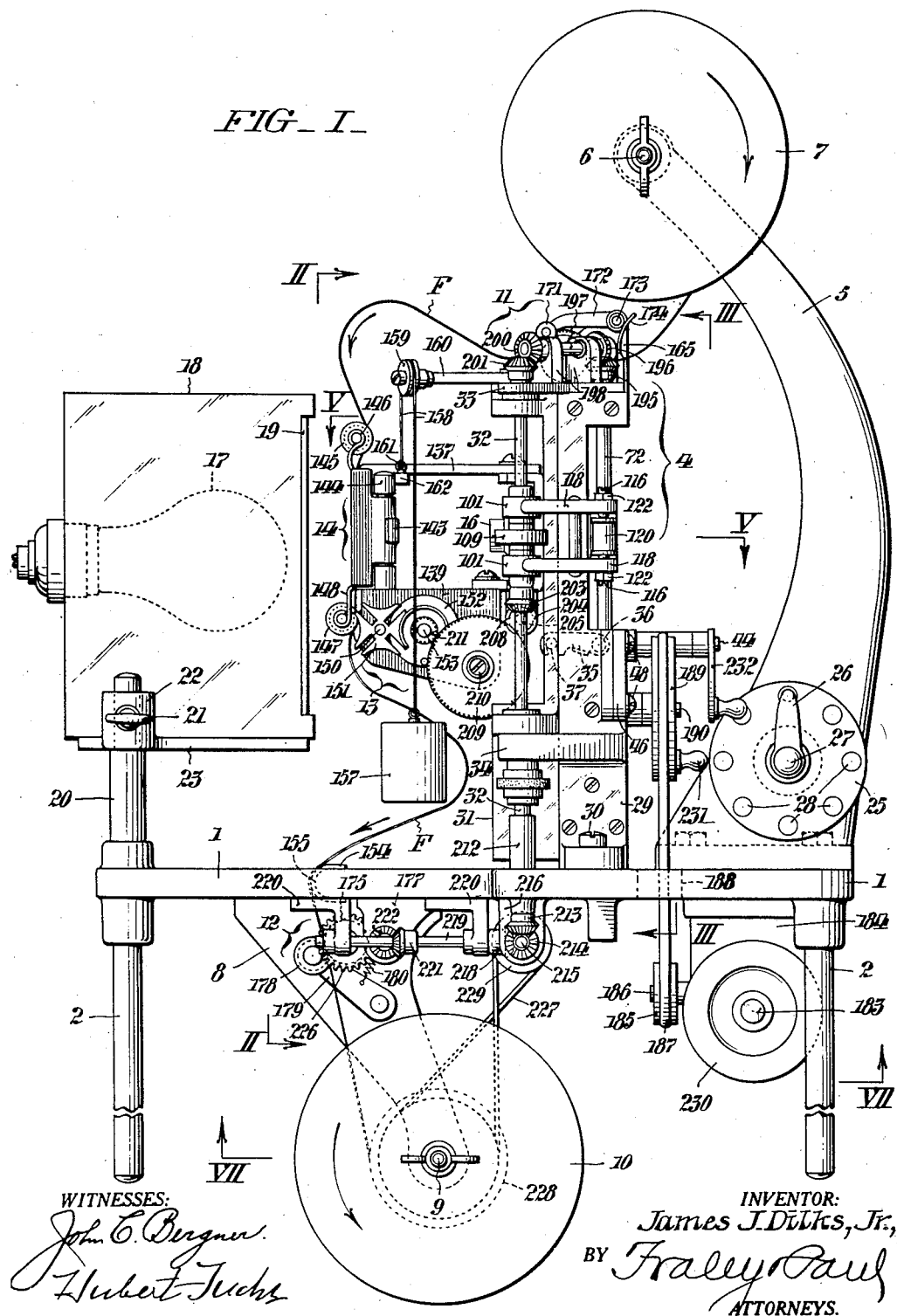
FIG_I_
WITNESSES:
John E. Bergner
Hubert Fuchs
INVENTOR:
James J. Dilks, Jr.,
BY Fraley Paul
ATTORNEYS.

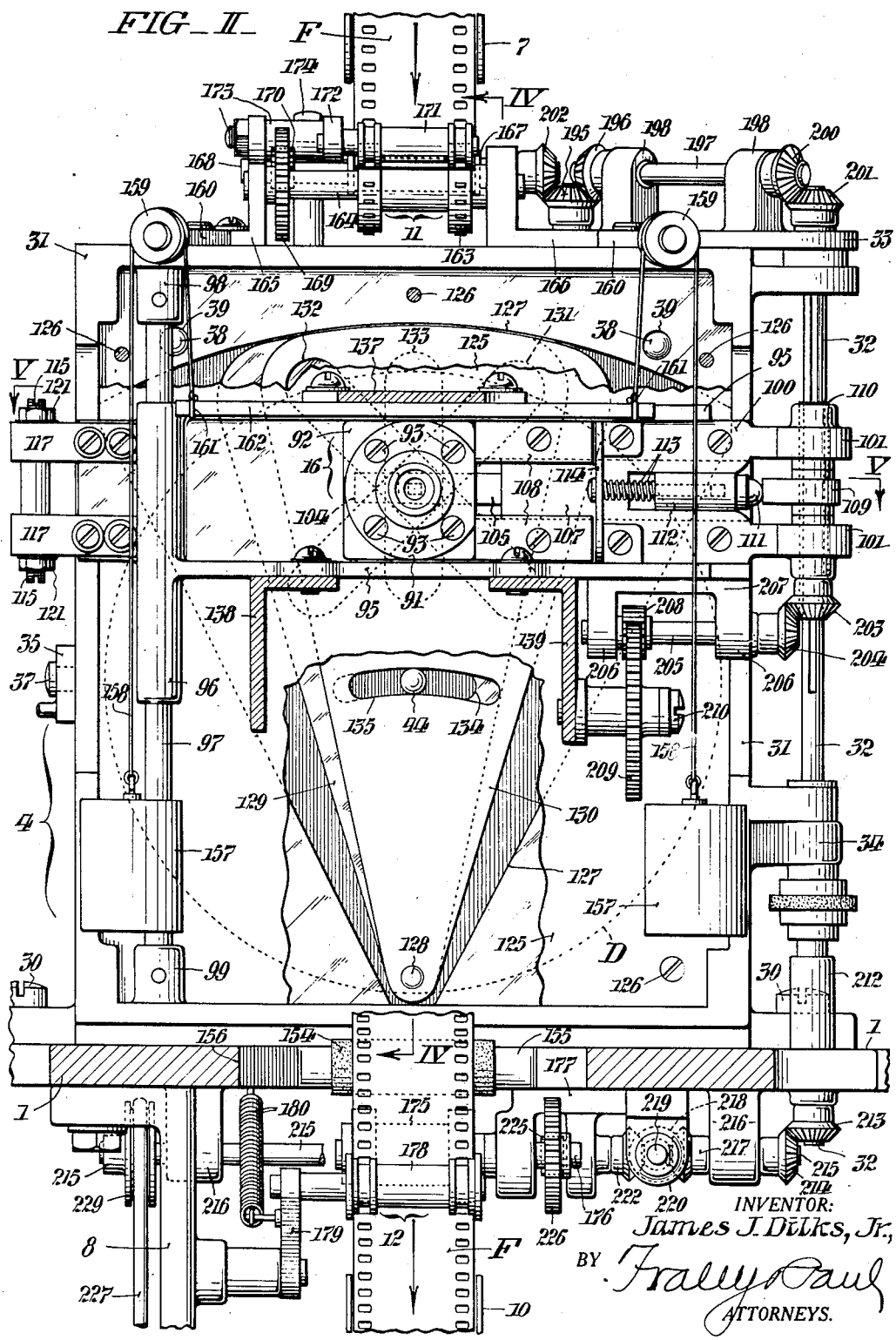

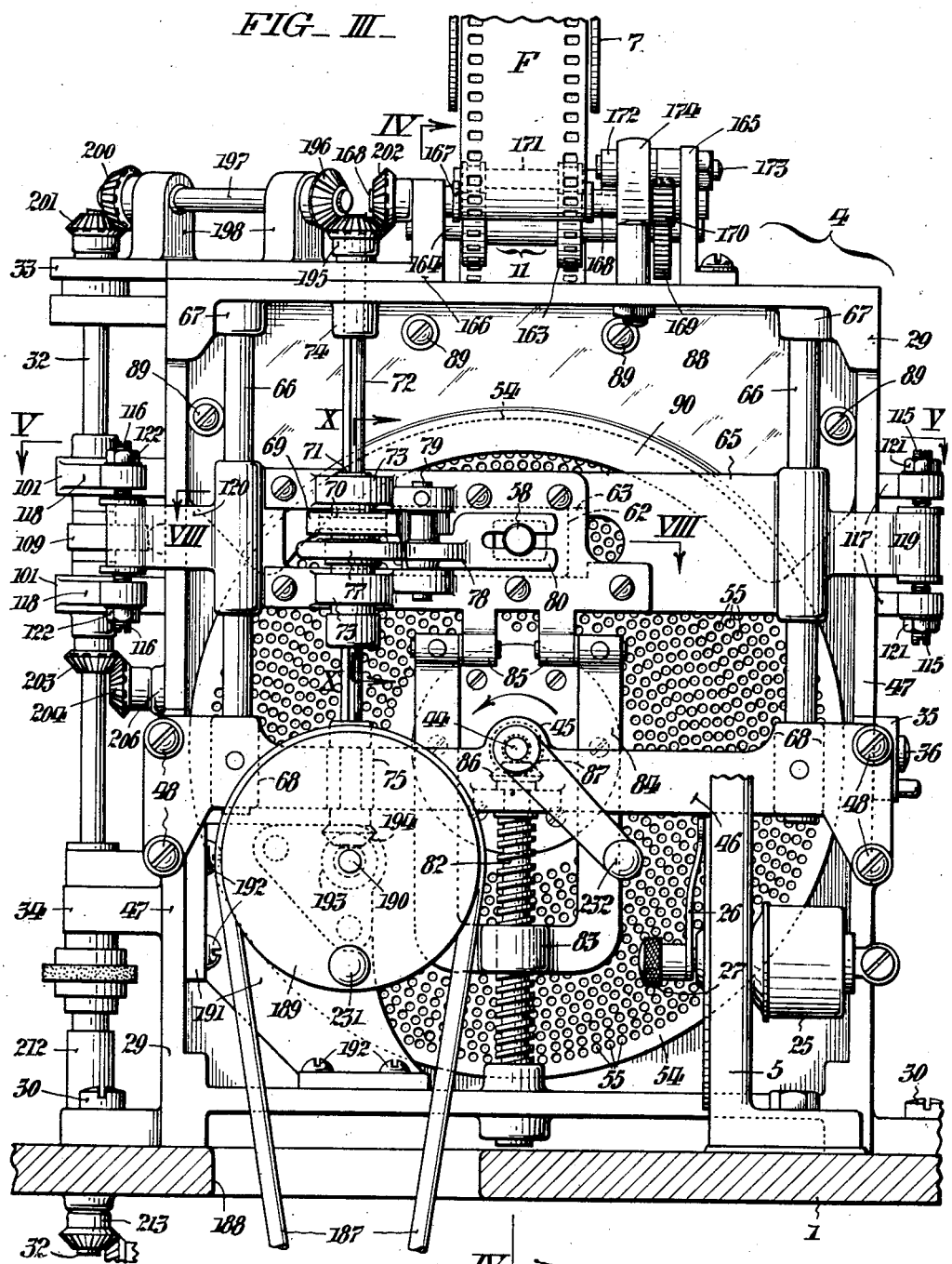

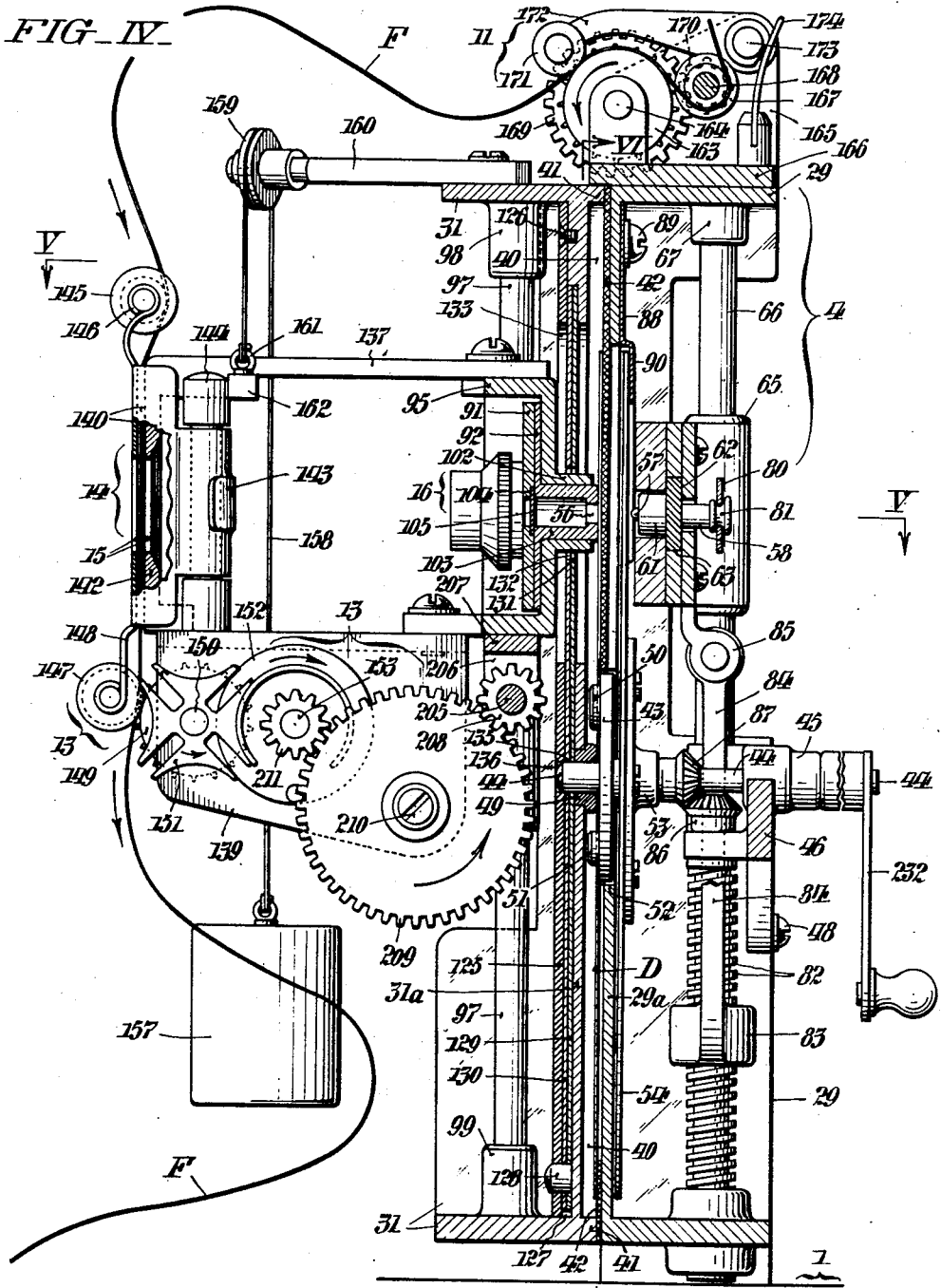

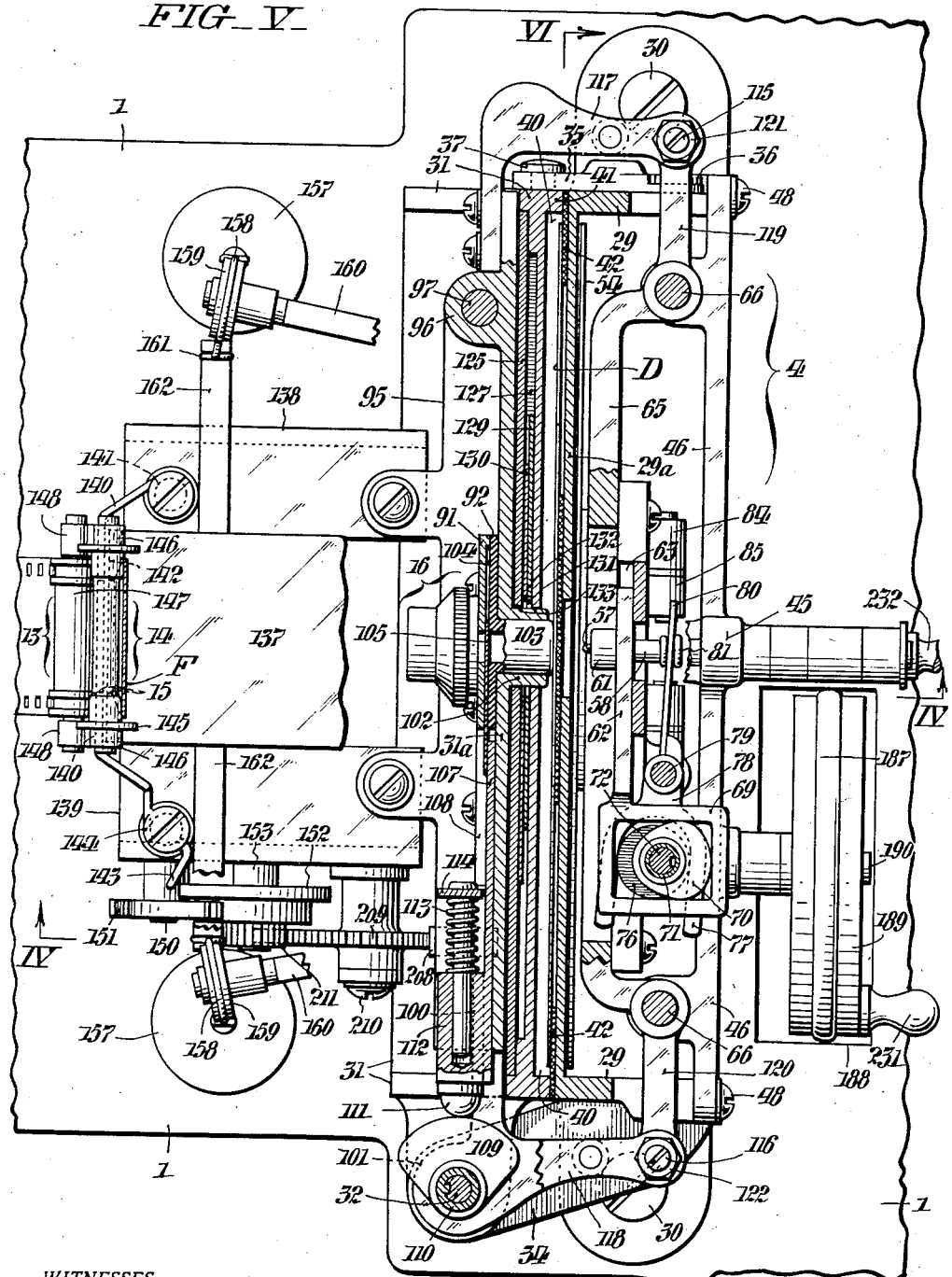

Nov. 14, 1939.   J. J. DILKS, JR   2,179,617
PHOTOGRAPHIC REPRODUCTION APPARATUS
Original Filed June 19, 1935   9 Sheets-Sheet 6
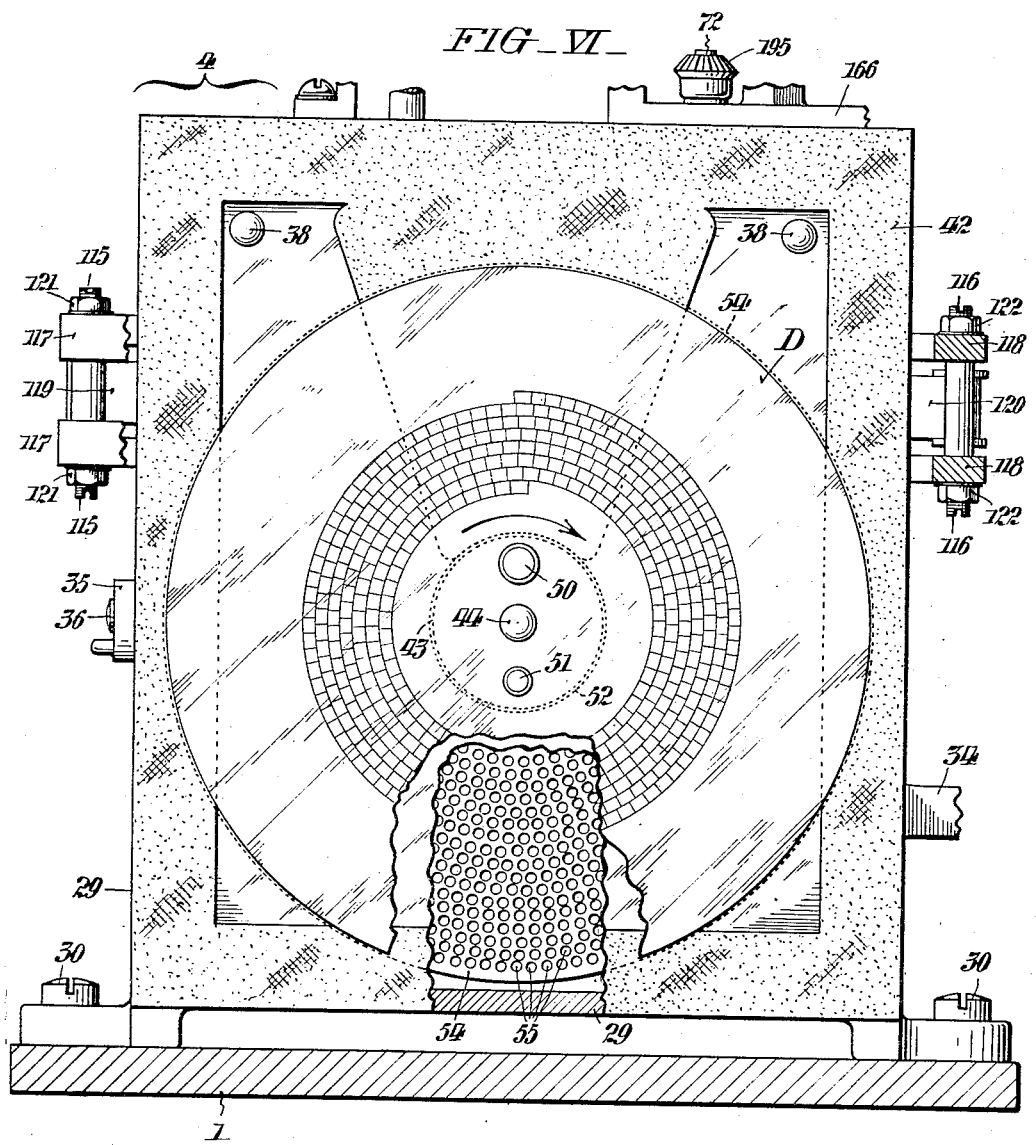

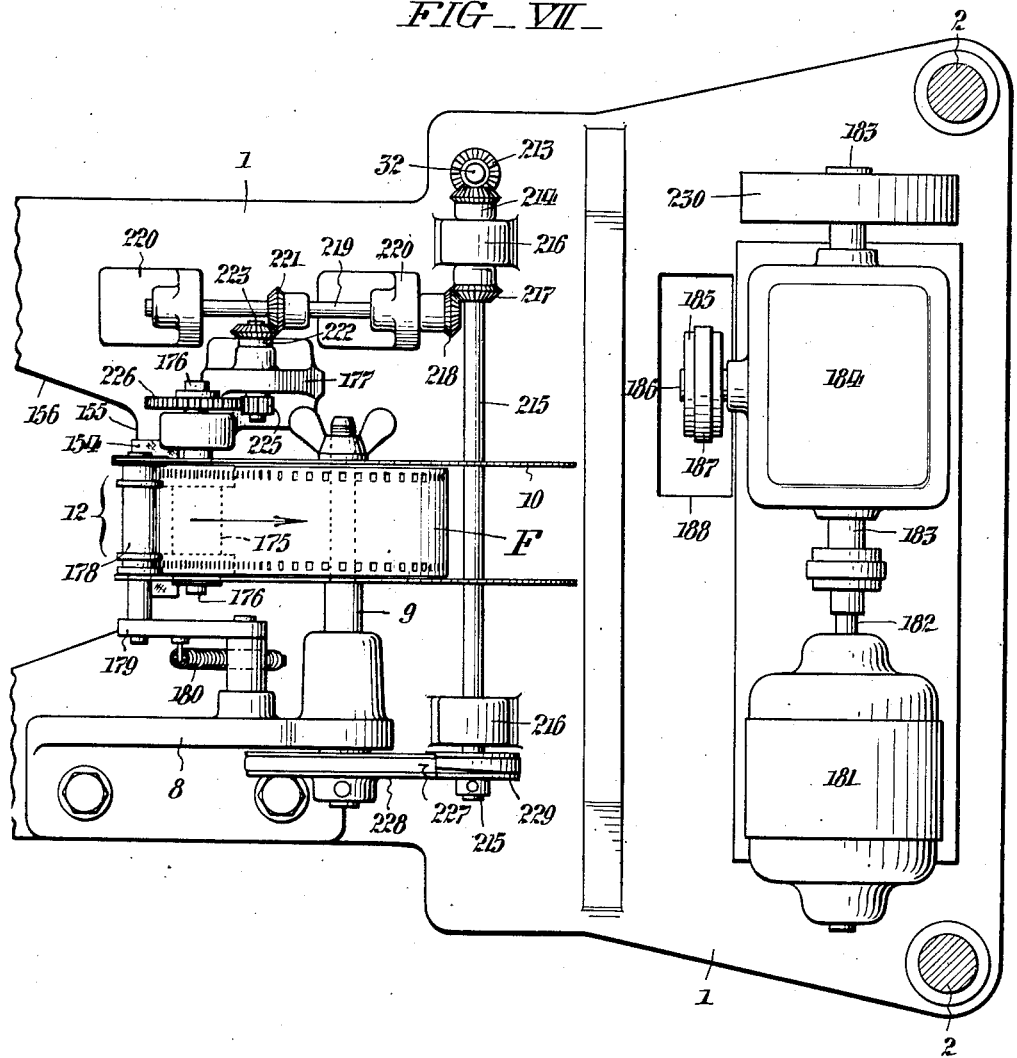

Nov. 14, 1939.  J. J. DILKS, JR  2,179,617
PHOTOGRAPHIC REPRODUCTION APPARATUS
Original Filed June 19, 1935  9 Sheets-Sheet 8
FIG_VIII_
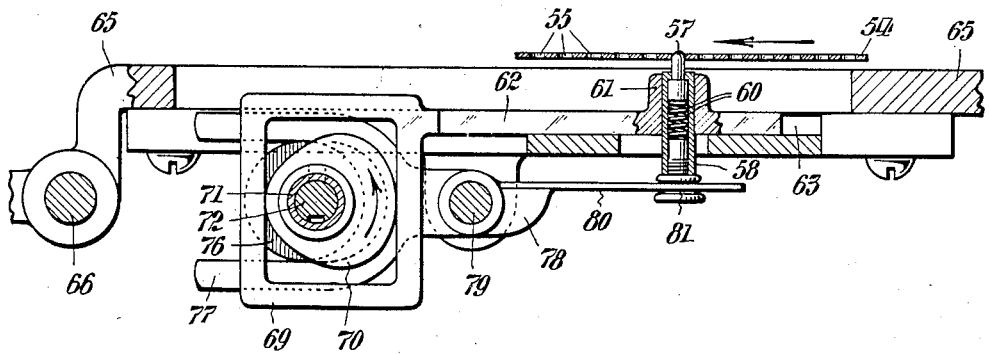
FIG_IX_
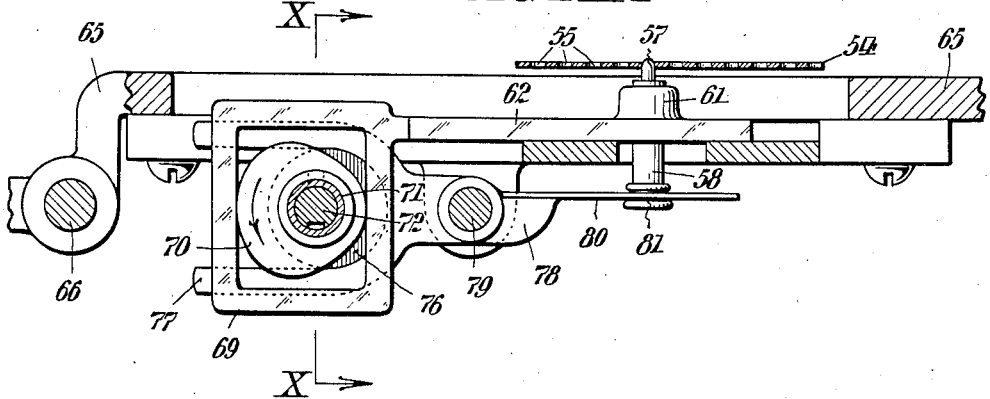
FIG_X_
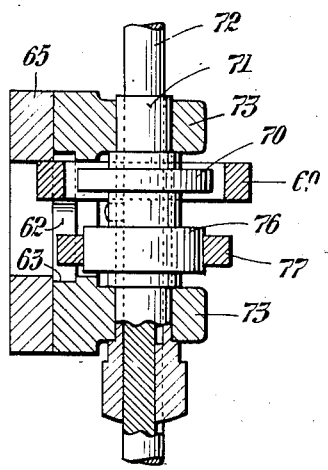
WITNESSES:  
John E. Bergner  
Hubert Fuchs
INVENTOR:  
James J. Dilks, Jr.,  
BY Fraley Paul  
ATTORNEYS.

Nov. 14, 1939.  J. J. DILKS, JR  2,179,617
PHOTOGRAPHIC REPRODUCTION APPARATUS
Original Filed June 19, 1935  9 Sheets—Sheet 9
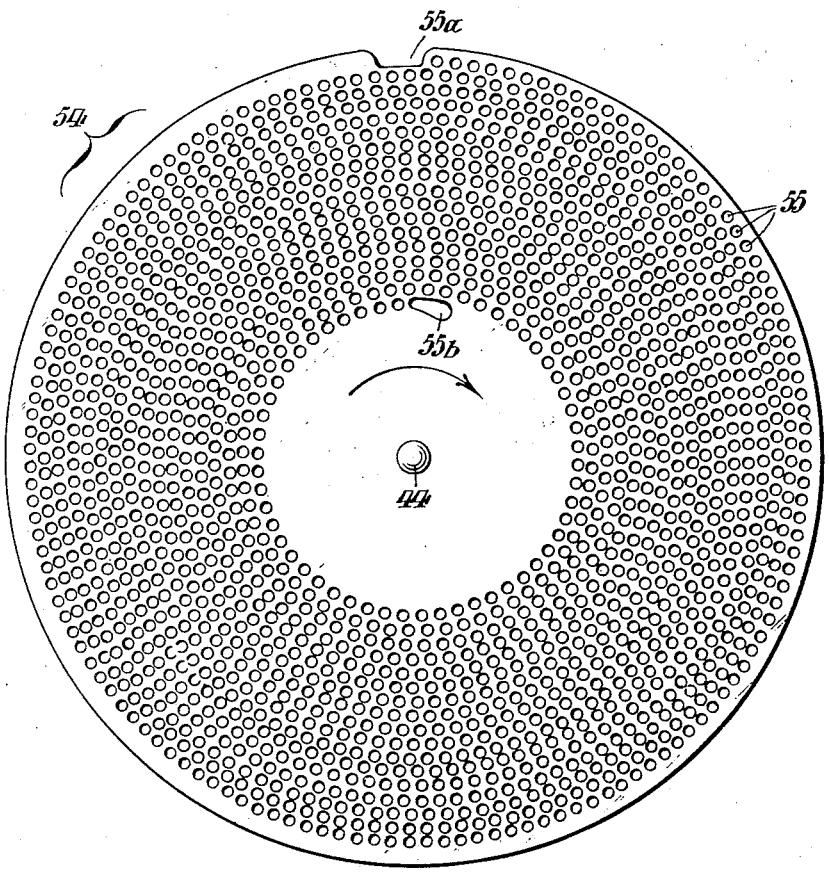

Patented Nov. 14, 1939

2,179,617

UNITED STATES PATENT OFFICE 2,179,617

PHOTOGRAPHIC REPRODUCTION APPARATUS

James J. Dilks, Jr., Haddon Heights, N. J.

Substituted for abandoned application Serial No. 27,311, June 19, 1935. This application October 20, 1937, Serial No. 170,129

4 Claims. (Cl. 88—24)

This invention relates to photographic reproduction apparatus; and it has reference more particularly to apparatus for making reproductions of motion picture ribbon films on disk negatives from which positives can be printed for use in projectors such as disclosed in a copending application Serial No. 7,562, filed by me on February 21, 1935. The present application is a substitution of a previous application Serial Number 27,311, filed by me on June 19, 1935.

The chief aim of my invention is to make possible the reproduction of the pictures of a motion picture ribbon along a spiral on a circular negative film disk with the pictures arranged in direct contiguity both circumferentially and radially of the disk. This aim I realize in practice, as hereinafter more fully disclosed, through provision of an apparatus embodying means for intermittently progressing a ribbon film in such manner that its pictures are successively presented before the lens of a camera, and for concurrently moving the disk negative intermittently in such a way that small areas of its surface are successively presented along a spiral line to the lens receiving the images from the ribbon film, and with means which, during contemporaneous dwells of said ribbon film and the negative film disk, operate a shutter to uncover the lens.

A further aim of my invention is to provide in connection with apparatus of the kind referred to, a simple and compact actuating mechanism which can be relied upon to concurrently actuate progressing means whereby the film ribbon and the film disk are intermittently shifted as above set forth and for actuating the lens shutter of the camera in proper timed relation with the shifts of said ribbon film and said disk.

Other objects and attendant advantages will appear from the following detailed description of the drawings, wherein Fig. I shows, in side elevation, a photographic reproduction apparatus conveniently embodying the present improvements.

Fig. II is a cross section on a larger scale taken as indicated by the arrows II—II in Fig. I, with parts broken out to expose important details which would otherwise be concealed.

Fig. III is a cross section taken as indicated by the arrows III—III in Fig. I.

Fig. IV is a longitudinal section of the camera taken as indicated by the arrows IV—IV in Figs. II, III and V.

Fig. V is a fragmentary horizontal section taken as indicated by the arrows V—V in Figs. I, II, III and IV.

Fig. VI is a fragmentary transverse sectional view taken as indicated by the arrows VI—VI in Figs. IV and V.

Fig. VII is a fragmentary bottom plan section of the apparatus taken as indicated by the arrows VII—VII in Fig. I.

Fig. VIII is a detail sectional view taken as indicated by the arrows VIII—VIII in Fig. III showing the picker means by which a drive disk for the negative film disk is intermittently rotated.

Fig. IX is a view corresponding to Fig. VIII with the parts of the picker mechanism in different positions.

Fig. X is a detail cross sectional view taken as indicated by the arrows X—X in Figs. III and IX; and Fig. XI shows the face view of the drive disk for the negative film disk.

Referring first more particularly to Fig. I of these illustrations, my novel photographic reproduction apparatus comprises a bed plate 1 which is supported at a convenient height from the floor by legs 2. Mounted on the bed plate 1, near the center, is a camera which is comprehensively designated by the numeral 4, said camera being, generally speaking, of the construction disclosed in my co-pending application, Serial No. 7,560, filed on February 21, 1935. Bolted to table 1 behind the camera 4 is a forwardly curving upright arm 5, which, at its upper end, carries a spindle 6 for a reel 7 for a motion picture ribbon film F, of which the exposures or pictures are to be successively reproduced along a spiral on a negative film disk (Figs. IV, V and VI) within the camera. Pendant from the table 1 is an arm 8, which, at its end, carries a spindle 9 for a reel 10 that receives the ribbon film F incident to photographing thereof. By suitable feed means 11 and 12 respectively adjacent the reels 7 and 10, the ribbon film F is unwound at a definite rate from the reel 7 and re-wound upon the reel 10; while the means shown at 13 is concurrently operative to intermittently move the film through a guide 14 for presentation of its pictures successively to an exposure aperture 15 in said guide, the ribbon film being directed into the guide from above. As shown, the guide 14 is aligned in advance of the lens holder 16 of the camera 4. The light for photographing is supplied by an electric bulb 17 within a protective casing 18 having a frosted glass light-diffusing front 19, said casing being supported directly ahead of the apertured guide 14 for the ribbon film F by an upward prolongation 20 of one of the legs 2. The securing means for the light casing 18 comprises a winged screw 21 which is threaded into a boss 22 at the bottom 23 of the casing and engages the top of the leg extension 20. The casing 18 can be swung about the leg extension 20 as a center when access to the interior is necessary for bulb replacements, and to afford access to the camera for insertion and removal of the disk negatives. Suitably disposed in a circuit with the light bulb 17 is a rheostat 25 of conventional design having a contact finger 26 with a manipulating knob 27 whereby said finger can be shifted over resistor contacts 28 in controlling the intensity of the light as may be required.

From Figs. II–VI it will be observed that the camera 4 comprises a rectangular housing frame component 29 which is secured to the table 1 by screws 30, and a complemental rectangular frontal component or door 31 capable of being swung about a vertical shaft 32 as an axis, said shaft having journal support in upper and lower bearing lugs 33 and 34 projecting laterally and forwardly from the housing component 29. A hook latch 35 pivoted at 36 to the housing component 29 and engaging a stud 37 on the door component 31, serves as a means to secure the latter in closed position, see Figs. I, II and V, while forwardly projecting dowel pins 38 on the frame 29 register with correspondingly-allocated apertures 39 in the door component to keep the latter properly aligned.

As shown in Figs. IV and V, the door component 31 of the camera 4 is recessed on its inner side, with formation of a chamber 40 to accommodate the negative film disk D and a perimetric flange 41 to bear light-tightly against a facing 42 of felt or the like on the contiguous face wall 29a of the housing component 29. The mounting for the film disk D has the form of a circular plate 43 which is secured to a horizontal shaft 44 with journal support at its rear end in a bearing boss 45 centrally of a transverse bar 46 which is secured at opposite ends to the rearward vertical edge flanges 47 of the housing component 29 by screws 49. The shaft 44 also has journal support in a bearing bushing 49 set into the wall 31a of door component 31 of the camera 4, the forward end of said shaft being rounded as shown to facilitate entry into the bushing incident to closing of the camera. The film disk D it will be noted, has a central hole to engage over the shaft 44, as well as two diametral apertures respectively at opposite sides of the center hole to engage with studs 50 and 51 respectively of different diameters projecting from the mounting plate 43. As shown in Fig. IV, the mounting plate 43 occupies an opening 52 in the wall 29a housing component 29 with its front face disposed in the plane of the felt facing 42 so that the film disk D is suitably braced at the back incident to being rotated as later on more fully explained.

Secured to the shaft 44 at the back of the housing component 29 is the hub member 53 of a metallic drive disk 54 having a series of circular holes 55 spaced along a spiral by a distance corresponding to the width of a rectangular exposure aperture 56 (Fig. IV) in the lens holder 16, the spiral having a pitch equal to the height of said aperture. The drive disk 54 is intermittently rotated by means of a picker in the form of a shouldered stud 57 which has a rounded end (Figs. VIII and IX) of a diameter accurately fitting the circular holes 55 in said disk. The picker stud 57 is lodged within a hollow pin 58 and urged by a spring 60 toward the disk as far as its shoulder will permit, said pin being axially movable in the boss 61 of a slide 62 confined to reciprocation transversely of the camera in a guideway 63. As shown, the guideway is formed on a carriage 65 which is movable up and down on vertical guide rods 66 secured at their upper ends in anchorage bosses 67 on the housing component 29, and at their lower ends in bosses 68 on the bridge piece 46. The slide 62 (Figs. VIII and IX) is formed at one end with a square loop 69 to cooperate with a rotary cam 70 which is secured to a sleeve 71 splined on a vertical shaft 72, and held against displacement between vertically spaced bearings 73 on the carriage 65, the throw of the cam being such as to cause shifting of the drive disk 54 a distance corresponding to the circumferential spacing of the holes 55 in said disk. The shaft 72 is journaled at its upper end in a bearing 74 on the frame 29, and adjacent its lower end in a bearing 75 on the bridge piece 46. Fast on the sleeve 71 is another rotary cam 76 which cooperates with the forked end 77 of a lever 78 fulcrumed at 79 on the carriage 65. The opposite flexible end 80 of the lever 78 is clevised to engage a circumferentially grooved head 81 on the picker pin 58. Thus, as the shaft 72 rotates, rocking movement is imparted to the lever 78 whereby the picker stud 57 is withdrawn and held from engagement with the drive disk 54 during the reciprocating movements imparted to the slide 62 by the cam 70.

The carriage 65 is intermittently shifted vertically on the guide rods 66 concurrently with the rotative shifts of the drive disk 54, so that the picker is bodily moved radially of the shaft 44 to follow the spiral line of holes 55 in said disk. The means by which this is accomplished includes a vertical screw spindle 82 which engages an internally threaded boss 83 centrally of the bottom of a yoke member 84 pivotally suspended from pendant lugs 85 of the carriage 65. Intermittent rotary motion is imparted to the screw spindle 82 through the medium of a miter gear 86 in mesh with a companion miter gear 87 on the shaft 44 of the drive disk. A guard 88 (Figs. III and IV) secured to the back of the camera housing component 29 by screws 89, has an arcuate flange 90 which laps the edge of the drive disk 54 and thereby prevents the latter from whipping incident to rapid actuation of the camera mechanism.

Referring to Figs. II, IV and V, the lens holder 16 comprises a pair of superimposed plate members 91 and 92 which are secured by screws 93 to a lens carriage 95 at the front of the camera, said carriage being provided at one end with an elongate boss 96 for guidance on a vertical rod 97 anchored at its upper and lower ends in bosses 98 and 99 on the door component 31 of the camera. Affixed to the opposite end of the carriage is a plate 100 with vertically spaced projecting bearing arms 101 which engage the shaft 32 so as to be guided thereby. At the back, the carriage 95 is formed with a boss 102 that receives a rearward projection 103 of the lens holder plate 92, the end of said projection bearing directly against the film disk D when the door component 31 of the camera is closed as shown and keeping it pressed lightly but firmly against the felt facing 42 on the frame 29 of the camera. The projection 103 of the lens holder plate member 92 is hollow and provides the lens aperture 56. At the inner side, the lens holder plate member 91 is recessed so that there is formed jointly with the lens holder plate member 92, a guideway 104 for the tongue 105 of a shutter adapted to be moved across the lens aperture. As shown in Fig. II, the shutter tongue 105 forms part of a slide 107 which is confined to horizontal reciprocation by guide plates 108 on the carriage 95. Reciprocatory motion is imparted to the slide 107, by means of a rotary cam 109 on a sleeve 110 having a sliding spline connection with shaft 32 and held in place between the bearings 101, said cam cooperating with a rounded projection 111 on a boss 112 of the slide. A spring 113 in compression between the boss 112 of said slide 107 and a cross piece 114 secured to the carriage 95, serves to maintain the rounded projection 110 yieldingly in contact with the cam 109. The carriage 95 receives its up and down movements from the picker carriage 65 at the back of the camera through end connections including screw studs 115 and 116, which are adjustable respectively in the rearwardly reaching arms 117 and 118 of said lens carriage, and which engage the tops and bottoms of outwardly reaching arms 119 and 120 on said picker carriage 65, see Figs. I, II, III and V. By adjusting the screws 115 and 116, it is possible to accurately align the picker stud 57 with the aperture 56 of the lens holder 16, the adjustment being fixable by jamb nuts 121 and 122 respectively associated with said screws. The construction just described permits of the outward swinging of the door component 31 of the camera when inserting and removing the film disks incident to which the screws 115 and 116 merely ride off the arms 119 and 120 of the picker carriage 65 in a manner obvious from Figs. III and V.

As shown in Figs. II, IV and V, a plate 125 secured by screws 126, covers a recess 127 of triangular configuration in the wall 31a of the door component 31 of the camera. Pivoted to swing on the stud 128 at the bottom of this recess 127 are overlapping sectors 129 and 130 of blackened sheet metal or the like, formed adjacent their upper ends with oppositely inclined cam slots 131 and 132 to engage the rearward boss 102 on the lens holder plate member 92. Thus, as the carriage 95 moves up or down, the sectors 129, 130 are caused to overlap to various extents and so prevent entry of light through a vertical slot 133 in the cover plate 125 into which the rearward boss 102 on the lens holder plate member 92 projects. At an intermediate point, the sectors 129 and 130 are respectively provided with coinciding slots 134 and 135 which are curved concentrically with the pivot stud 128 to clear the forwardly-projecting rounded end of the shaft 44, which latter engages an aperture 136 provided for its reception in the cover plate 125.

Reaching forwardly from the center of the lens carriage 95 at the top, is a bracket plate 137; and reaching forwardly from the bottom of said carriage, is a pair of coextensive, laterally-spaced, symmetrically-disposed angle bar brackets 138 and 139 which plate and brackets jointly support the guide 14 for the ribbon film F at the proper focal distance from the lens (not illustrated) in the lens holder 16 of the camera 4. To facilitate threading of the ribbon film F, the frontal component 140 of the guide 14 is hinged at one side edge on a stud screw 141 on the bracket 138 so that it may be swung outward away from the fixed component 142 of said guide; and at its other side edge, said frontal component 140 is formed with a spring clip 143 adapted to releasably engage a screw stud 144 on the bracket 139 as shown in Figs. IV and V. The ribbon film F passes into the interval between the two components 140, 142 of the guide from above over a roller 145 whereof the trunnions are free to rotate in bearings 146 on the guide component 140. In leaving the guide 14, the ribbon film F passes between a roller 147 whereof the trunnions are freely rotatable in a pendant bearing 148 on the frontal component 140 of the guide, and a toothed drive roller 149 forming a part of the feed means 13. The shaft 150 of the roller 149 is journaled in the bracket 139, and at its outer end has secured to it the star wheel 151 of a Geneva motion whereof the actuating disk 152 is secured to another shaft 153 also journaled in said bracket. The film F is directed between the rollers 147 and 149 of the feed means 13 over a pad 154 of felt or the like covering the rounded edge 155 of a recess 156 at the front of the table 1, see Figs. I, II and VII.

The carriages 65 and 95 and their appendages are counterbalanced by a pair of weights 157 respectively attached to cords 158 which run over idler sheaves 159 supported for free rotation by arms 160 reaching outward from the top of the door component 31 of the camera, and which are secured to eyes 161 at the ends of a laterally-extending bar 162 on the bracket plate 137, see Figs. I, II, IV and V. As a result of the provisions just described, the up and down movements of the carriages 65 and 95 are eased with prevention of binding of said carriages with their vertical guides.

The feed means 11 hereinbefore mentioned includes a roller 163 with teeth to engage the marginal apertures in the ribbon film F, said roller being secured to a shaft 164 with journal support in bearing brackets 165 and 166 at the top of the housing component 29 of the camera. On its way from the reel 7, the ribbon film F is directed to the roller 163 by an associated guide roller 167 on another shaft 168 also having journal support in the bearing brackets 165 and 166, the shafts 164 and 168 being coordinated by intermeshing spur gears 169 and 170, see Figs. II, III and IV. An idler roller 171 at the end of an arm 172 swingable on the pivot stud 173 on the bracket 165 and subject to a leaf spring 174, serves to yieldingly hold the ribbon film F against the toothed roller 163.

The feed means 12 (Figs. I, II and VII) is generally similar to the feed means 11 in that it includes a toothed roller 175 to engage the marginal apertures of the film, the shaft 176 of said roller being journaled in a bearing bracket 177 beneath the table 1. A roller 178 freely rotatable at the end of an arm 179 pivoted on the bracket 8 and subject to a spring 180, serves to maintain the ribbon film F in contact with the toothed roller 175.

The drive mechanism of the apparatus comprises an electric motor 181 (Fig. VII) which is suspended from the underside of the table 1 and whereof the shaft 182 is directly coupled with the input shaft 183 of a suitable speed reduction unit 184. A pulley 185 on the delivery shaft 186 of the speed reduction unit 184 is coordinated by a belt 187 extending up through an opening 188 in the table 1, with another pulley 189 (Figs. I, III and V) on a short horizontal shaft 190 which is journaled in a corner bracket 191 attached by screws 192 to the frame 29 of the camera. A miter gear 193 on the shaft 190 serves, by coaction with another miter gear 194 at the bottom end of the shaft 72, to constantly rotate the latter shaft. A miter gear 195 at the upper end of the shaft 72 meshes with a companion miter gear 196 on the contiguous end of a horizontal shaft 197 journaled in spaced bearing lugs 198 of the bracket 166 at the top of the housing component 29 of the camera 4. At its outer end, the horizontal shaft 197 carries a miter gear 200, which, through an intermeshing miter gear 201, transmits motion to the shaft 32. Also meshing with the miter gear 195 at the top of the shaft 72, is a miter gear 202 on the shaft 168 of the roller 167 embodied in the feed means 11 for the ribbon film F. Secured to the bottom end of the cam sleeve 116 on the shaft 32 is a miter gear 203 which meshes with a miter gear 204 on a short horizontal shaft 205 journaled in pendant bearings 206 of a bracket 207 on the lens carriage 95 (Fig. II) at one end thereof. Secured to the shaft 205 in the interval between the bearings 206 is a spur gear pinion 208 which meshes with an idler spur gear wheel 209 free on a screw stud 210 which projects laterally from a bracket arm 139 on the carriage 95. The wheel 209, in turn, meshes with another spur gear pinion 211 on the shaft 153 for the driving element 152 of the Geneva movement by which the feed means 13 is intermittently operated. From Figs. I, II and VII it will be noted that the shaft 32 extends down through a bearing 212 on the table 1, and that to its bottom end is secured a miter gear wheel 213 which meshes with a miter gear wheel 214 on a transverse horizontal shaft 215 with journal support in spaced bearings 216 pendant from said table. Another miter gear 217 on the shaft 215 meshes with a miter gear 218 on longitudinally-extending horizontal counter shaft 219 likewise journaled in spaced bearings 220 pendant from the table 1. A miter pinion 221 on the countershaft 219 intermediate the bearings 220, drives an intermeshing miter pinion 222 on a shaft 223 journaled in the bracket 177, and from the latter shaft continuous movement is transmitted to the roller shaft 176 of the feed means 12 by a pair of intermeshing spur gears 225 and 226. The take-up reel 10 for the ribbon film is rotated in the direction of the arrow in Fig. I by a crossed slip belt 227 which connects a pulley 228 on the spindle 9 of said reel with a smaller pulley 229 on the transverse horizontal shaft 215. A relatively heavy fly wheel 230 (Figs. I and VII) on the main shaft 183 of the speed reduction unit 184 functions as a means to render the action of drive mechanism of the apparatus smooth and vibrationless. The ratios of the various gears embodied in the drive mechanism and the timing of the cams embodied in the mechanism of the camera 4 are such that the ribbon film F and the negative film disk D are intermittently shifted, and that the lens shutter 105 is retracted to open the lens aperture 56 during the dwell periods between the concurrent shifts of said film and disk.

The operation of the apparatus is as follows: Under the drive of the electric motor 181, the vertical shaft 32 is constantly rotated by the interposed driving connections hereinbefore described, with resultant actuation of the Geneva movement 151, 152 and presentation of the pictures of the ribbon film F successively at the aperture 15 of the guide 14, the ribbon being fed at a definite constant rate by the feed devices 11 and 12 with maintenance of ample working slack in it above and below said guide. Concurrently with intermittent progression of the ribbon F as just explained, the negative film disk D is circumferentially shifted so that small areas of its surface corresponding in size to the lens aperture 56, are successively presented to said aperture when the lens shutter 105 is closed and obstructing said aperture. This shifting of the film disk D is accomplished by coaction of the picker stud 57 with the spirally arranged holes in the drive disk 54. During contemporaneous dwells of the ribbon film F and the film disk D, the lens shutter 105 is retracted from the lens aperture so that the image at that time in registry with the aperture 15 of the guide 14, is projected by the lens of the camera upon the exposed area of said film disk. By reason of the vertical travel of the picker and lens carriages 65 and 95 by the screw spindle 82, the picker stud 57 and the camera lens are caused to follow the spiral line of holes 55 in the drive disk 54, so that the transferred pictures arrange themselves correspondingly on the film disk D. The apparatus may be driven so that the reproduction on the film disk D starts either at a point near the center of said disk or at a point near the periphery thereof. In the present instance, rotation of the film disk D is as indicated by the arrow in Fig. VI, with the pictures starting near the center and ending at the periphery. Photographing proceeds automatically until an elongate idling notch 55a in the edge of the drive disk 54 arrives at the picker stud 57, whereupon the movement of said disk ceases. The motor 181 is then stopped, and the negative film disk D removed from the camera 4.

To re-set the apparatus for another reproduction, the pulley 189 is slightly turned by means of a finger knob 231 thereon for placement of the picker stud 57 in neutral position, i. e., out of contact with the drive disk 54. With this accomplished, the shaft 44 of the drive disk 54 can be reversely turned, for which purpose a hand crank 232 is provided on said shaft. By reverse turning of the shaft 44, the screw spindle 82 is rotated oppositely to lower the carriages 65 and 69 until the picker stud 57 registers with an elongate terminal idling aperture 55b at the inner end of the series of holes 55 in said drive disk. Finally, the ribbon film F is rewound and the reels 7 and 10 replaced in their original positions, or another ribbon film substituted; a new negative disk inserted into the camera 4; the motor 181 started; and the handle 232 on the shaft 34 given a slight tap to bring the first circular hole 55 adjacent the aperture 55b in the drive disk 54 into the path of the picker stud 57, whereupon the operation of the apparatus again proceeds automatically as before.

By virtue of the difference in the diameters of the studs 50 and 51 on the mounting plate 43, exact placement of the film disks in the camera is obviously insured. Such being the case, it is possible to produce, with absolute fidelity, as many duplicate disk negatives as may be desired from a ribbon film F.

Having thus described my invention, I claim:

1. A photographic reproduction apparatus comprising a carriage; an apertured guide for ribbon film and a camera lens supported in alignment on the carriage; means for intermittently progressing the ribbon film for presentation of its pictures successively at the aperture of the guide; a mounting in the camera for a negative film disk, said mounting having perforations spaced along a spiral line; a reciprocating picker on the carriage for successively engaging the perforations to intermittently rotate the disk mounting; a shaft with means for actuating the picker; means for progressively shifting the carriage radially of the disk mounting so that the pictures of the ribbon film are photographed on the film disk along a spiral line corresponding to that of the apertures in said disk mounting; and interposed drive connections whereby the ribbon film progressing means and the carriage shifting means are concurrently operated from the picker actuating shaft.

2. A photographic reproduction apparatus comprising a carriage; an apertured guide for ribbon film and a camera lens supported in alignment on the carriage; means for intermittently progressing the ribbon film for presentation of its pictures successively at the aperture of the guide; a mounting in the camera for a negative film disk, said mounting having apertures spaced along a spiral line; a reciprocating picker on the carriage for successively engaging the aperture to intermittently rotate the disk mounting; a shaft with means for actuating the picker; means deriving motion from the disk axis for progressively shifting the carriage radially of the disk so that the pictures of the ribbon film are photographed on the film disk along a spiral line corresponding to that of the apertures; and interposed drive connections whereby the ribbon film progressing means and the carriage shifting means are concurrently operated from the actuating shaft aforesaid.

3. A photographic reproduction apparatus according to claim 2, including means whereby, after the photographing of a predetermined number of pictures, the picker is automatically rendered inoperative with attendant cessation in the shifting of the carriage.

4. Photographic reproduction apparatus comprising a carriage; an apertured guide for a ribbon film, and a camera lens supported in alignment on the carriage; means for intermittently progressing the ribbon film for presentation of its pictures successively at the aperture of the guide; a mounting in the camera for a negative film disk; means including an actuating shaft for intermittently rotating the disk mounting; means coordinated with the axis of the disk mounting for shifting the carriage radially of the disk so that the pictures of the ribbon film are photographed along a spiral line on the negative film disk; interposed drive connections whereby the ribbon film progressing means and the carriage shifting means are concurrently operated from the aforesaid actuating shaft; and means whereby, after the photographing of a predetermined number of pictures, the means for rotating the disk mounting is automatically rendered inoperative with attendant cessation in the shifting of the carriage.

JAMES J. DILKS, Jr.